United States Patent [19]
Baker et al.

[11] 3,971,051
[45] July 20, 1976

[54] FOCUSING SCREEN

[75] Inventors: Philip G. Baker, Peabody; Bruce K. Johnson, Andover, both of Mass.

[73] Assignee: Polaroid Corporation, Cambridge, Mass.

[22] Filed: June 29, 1973

[21] Appl. No.: 375,015

[52] U.S. Cl. .............................. 354/201; 354/158; 354/188
[51] Int. Cl.² ................... G03B 13/28; G03B 19/12
[58] Field of Search ..................... 95/42, 49, 11 U; 350/211; 354/158, 188, 200, 201

[56] References Cited
UNITED STATES PATENTS

| | | | |
|---|---|---|---|
| 2,510,344 | 6/1950 | Law | 350/211 |
| 2,881,686 | 4/1959 | Ruhle | 95/49 X |
| 2,914,997 | 12/1959 | Grey | 95/42 |
| 2,955,507 | 10/1960 | Leitz | 95/49 X |
| 3,003,387 | 10/1961 | Schiele | 95/42 X |
| 3,195,432 | 7/1965 | Baluteau | 95/42 |
| 3,672,281 | 6/1972 | Land | 95/42 |
| 3,690,240 | 9/1972 | Gold | 95/42 |
| 3,719,130 | 3/1973 | Scott, Jr. | 95/49 X |
| 3,735,685 | 5/1973 | Plummer | 95/42 |

*Primary Examiner*—L. T. Hix
*Assistant Examiner*—E. M. O'Connor
*Attorney, Agent, or Firm*—Michael Bard; Frederick H. Brustman; John W. Ericson

[57] ABSTRACT

The invention is a focusing screen with an integral split image rangefinder located substantially away from the geometric center of the focusing screen. Such an arrangement improves photographic image acuity and it encourages better photographic composition.

14 Claims, 9 Drawing Figures

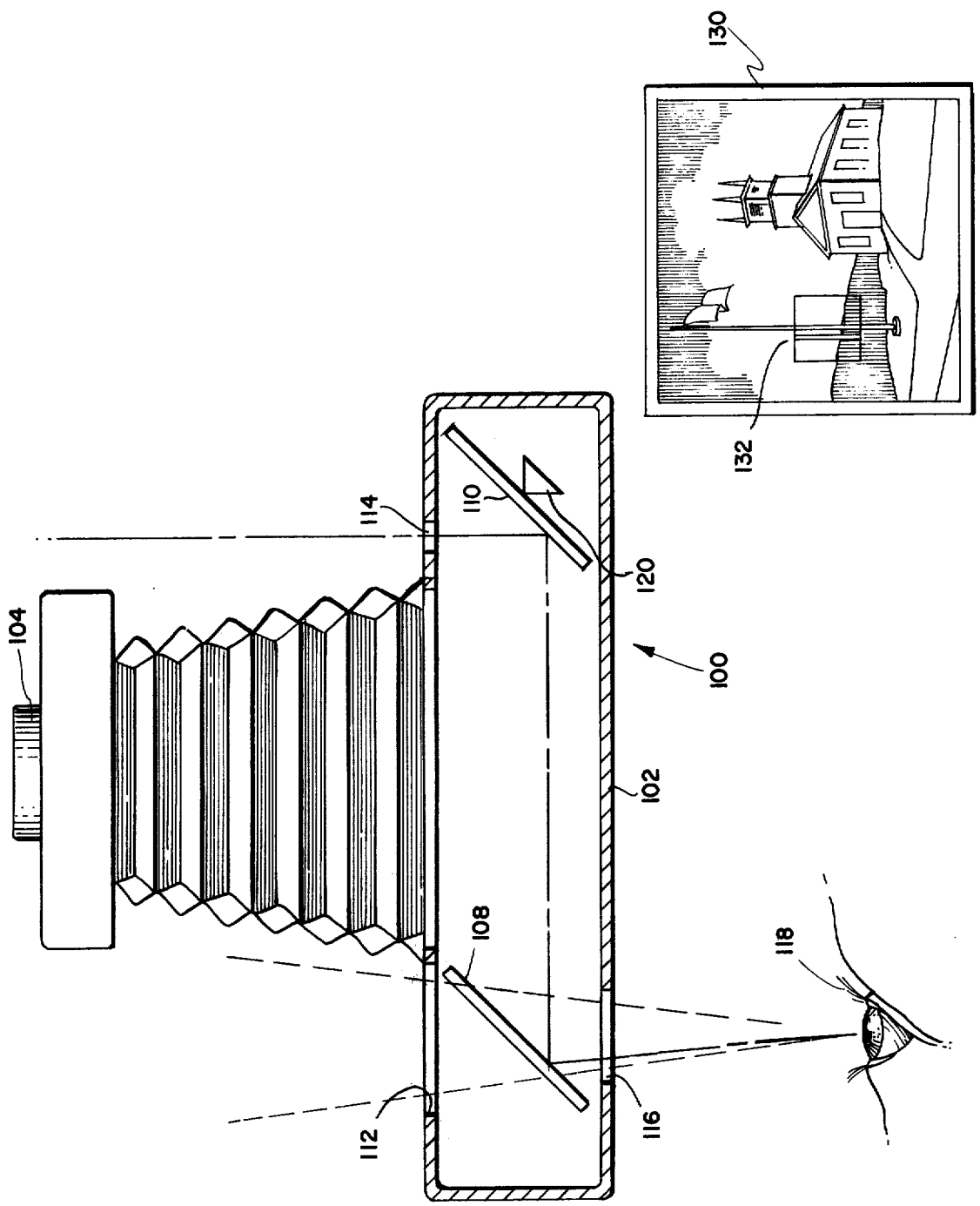

3,971,051

FOCUSING SCREEN

BACKGROUND OF THE INVENTION

The present invention is an improvement in a reflex camera focusing screen having vernier focusing. Vernier focusing, also referred to as split image ranging, relates to an optical arrangement wherein part of the image seen on the screen is misaligned, or split, with respect to itself, except when the image is focused exactly on the screen. The construction of the reflex camera is such that sharp focus on its focusing screen corresponds to sharp focus on its film plane.

The usefulness of a vernier focusing means lies in the ability of a user to more readily perceive the alignment of the image's parts than the sharpness of the image.

U.S. Pat. Nos. 2,881,686; 2,914,997; 2,980,001; and 3,498,198 illustrate a variety of focusing screens that are typical of the prior art. They all show vernier focusing means located in a small circle at the center of the focusing screen. One of them suggests a Fresnel mirror focusing screen with the vernier in the center comprising different Fresnel mirror elements.

The common fault of the prior art devices that this invention redresses is the effect of the vernier circle's central location on photographic composition. The central location induces a photographer to unconsciously rely on the vernier as a bull's-eye. This has a subtle but detrimental effect on the aesthetic composition of his photograph because he tends to merely center his subject with the vernier circle rather than affirmatively evaluating the composition on its aesthetic merits.

Another recognized fault of the prior art is the adverse effect the central location has on image acuity at the edge of the field. Camera objective lenses do not usually have flat fields. Their fields curve. The best focus of the curved field (focal surface) on a flat image surface is based on a compromise between zonal aberrations at the center (axis) of the field and the curved field off-axis. However, if the center of the image is sharply focused at the film plane, by using a split image means, the edge of an inwardly curving image will be focused well in front of the focal plane and be unsharp at the focal plane.

FIG. 5 illustrates the prior art, i,e., a flat focusing screen with a centrally located vernier means (in this instance crossed prisms or wedges to provide a split image feature). The off-axis portions of the focal surface curve markedly. Consequently, the image on the focusing screen, away from the center, is blurred.

An objective lens, by design, generally achieves improved overall results (sharpness) when the region of best focus is part way between the center of the field and the edge. Thus, the objective lens' curved image surface will intersect the film plane between the center and the edge of the field so the edge focuses slightly in front of the plane and the center focuses slightly behind the plane. This minimizes the possible loss in sharpness between the center and the edge of the field due to image curvature. Also, the region of best focus then encompasses a proportionally larger area. Locating the vernier means substantially off-center places it where it will yield best focus for the proportionally larger area and minimizes the possibility of an image sharply focused at the center but noticeably unsharp at its edges.

U.S. Pat. No. 3,699,867 should be noted. It shows a viewfinder for a popularly priced camera with a red square above the center of the field. The red square is a stadimeter rangefinder element. A photographer uses it by adjusting his distance from his subject so the subject's face fills the red square. He then knows he is separated by a predetermined distance from his subject. A portrait usually has the person's face above center; therefore, this viewfinder has the red square above center as a convenience for the photographer.

SUMMARY AND OBJECTS OF THE INVENTION

An object of the present invention is to provide a focusing screen with a vernier focusing means arranged so as to not interfere with the aesthetic composition.

Another object of the invention is to provide a focusing screen with a vernier focusing means located to effectuate the field curvature design compromise of an objective lens.

Still another object of the invention is to provide light condensing means integral with both the vernier focusing means and the focusing screen.

These and other objects of the invention are accomplished by constructing a focusing screen with a substantially off-center vernier means, preferably low in the field. The off-center arrangement results in an overall improvement in focus and unobtrusively reminds a photographer to aesthetically evaluate the composition of his scene after he uses the vernier to focus it. The latter effect reinforces his appreciation that composition and focus are separate considerations and results in more aesthetically pleasing photographs.

DESCRIPTION OF THE DRAWINGS

Other objects and many of the attendant advantages of the present invention will be better appreciated and said invention will become more clearly understood by reference to the following detailed description when considered in conjunction with the accompanying drawings illustrating the instant invention, wherein:

FIGS. 7a and 7b illustrate the present concept adapted to a camera with a coincident image type rangefinder.

DESCRIPTION OF THE PREFERRED EMBODIMENT

Figure 1:
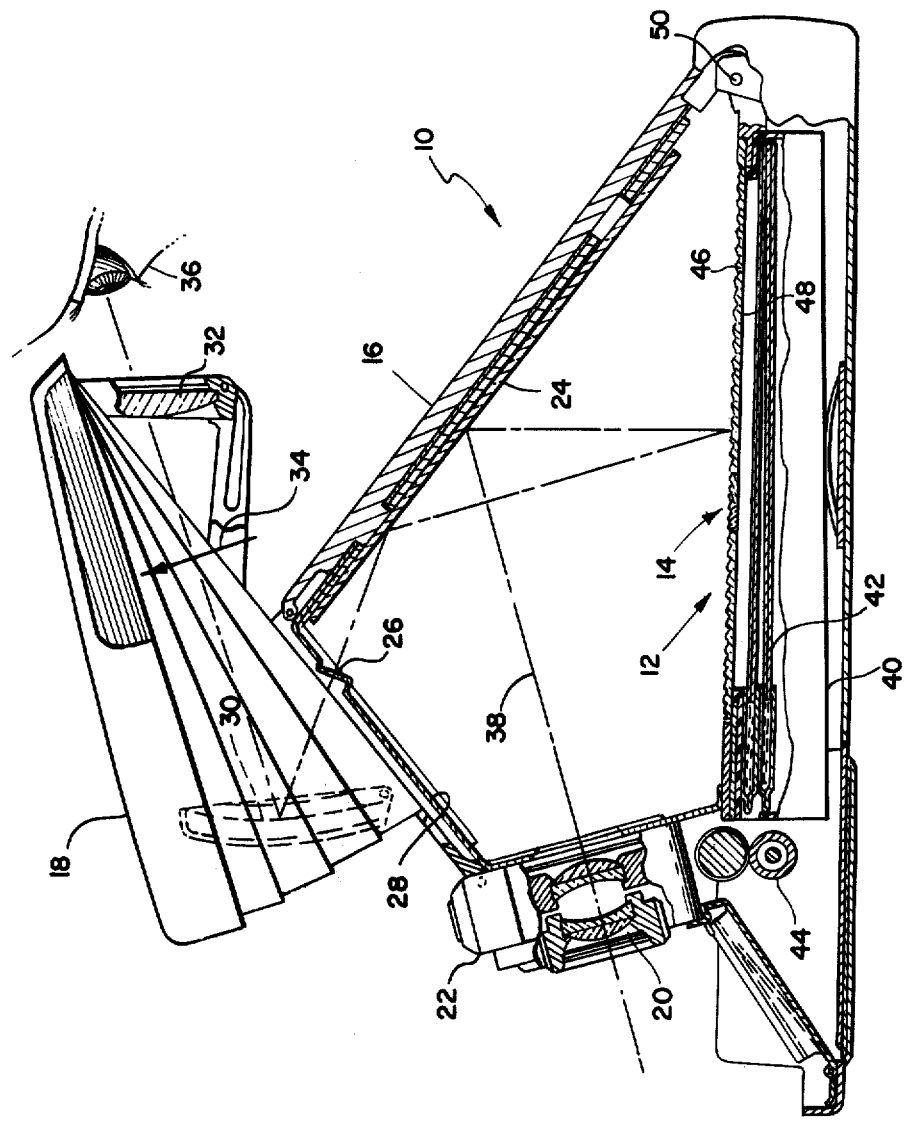
FIG. 1 illustrates a reflex camera utilizing the present invention.
Figure 6:
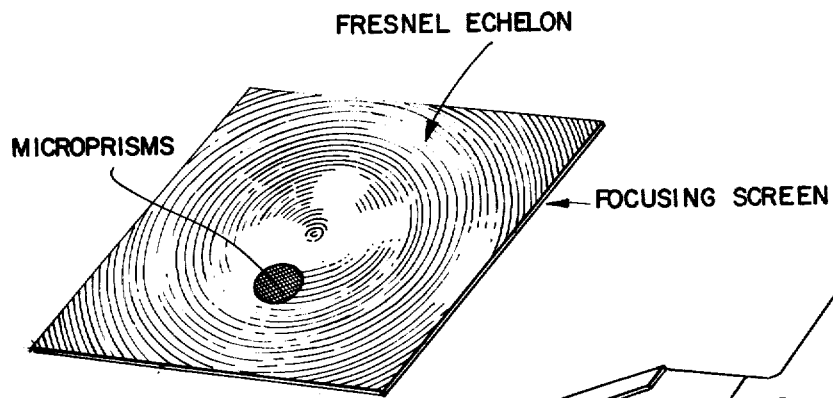
FIG. 6 illustrates a focusing screen according to the present invention with a micro-prism type vernier focusing means.

A reflex camera 10 including a Fresnel focusing screen 12 with a substantially off-center vernier focusing means 14 according to the present invention is shown in FIG. 1. The vernier focusing means 14 is sometimes referred to as a split image finder.

The reflex camera 10 includes a folding housing 16, surmounted by a viewer 18. Light enters an objective lens 20 in the reflex camera 10's shutter housing 22. The objective lens 20 refracts the light into a real image that a folding mirror 24 reflects towards the Fresnel focusing screen 12. The Fresnel focusing screen 12 is reflective and configured to reflect the light normally incident on it toward an aperture 26 in a folding boot 28 via a second reflection from the folding mirror 24. A principal light ray 38 exemplifies the path of light through the reflex camera 10 while the camera is in a mode adapted for viewing and focusing an image.

The rulings on the Fresnel focusing screen 12 act to form an image of the objective lens 20's aperture at the boot aperture 26. The foregoing arrangement assures an efficient transfer of light into the viewfinder 18 to promote the brightness of the image seen therein.

The viewfinder 18 includes a concave mirror 30 and an eye lens 32. The concave mirror 30 forms a real aerial image 34 of the Fresnel focusing screen 12 together with the image formed by the objective lens 20 on the Fresnel focusing screen 12. The eye lens 32 magnifies the aerial image 34 for an observer/photographer symbolized by the eye 36.

Other features of the reflex camera 10 include means for receiving a cassette 40 containing several film units 42 and a pair of processing rolls 44.

A carrier plate 46 covers the cassette 40 to prevent exposure and fogging of the film units 42 while the reflex camera 10 is in a focusing mode. The carrier plate 46 supports the Fresnel focusing screen 12 with the off-center vernier focusing means 14 on its upper side and a plane mirror 48 on its lower side. A pivot linkage 50 at the right end of the carrier plate 46 allows the carrier plate 46 to swing upward uncovering the film units 42 and positioning the plane mirror 48 to reflect onto the uppermost film unit 42 and image formed by the objective lens 20. The reflex camera 10 and its components are constructed so an image sharply focused on the Fresnel focusing screen 12 will be sharply focused on the uppermost film unit 42 after the carrier plate 46 reaches its uppermost position.

Figure 2:
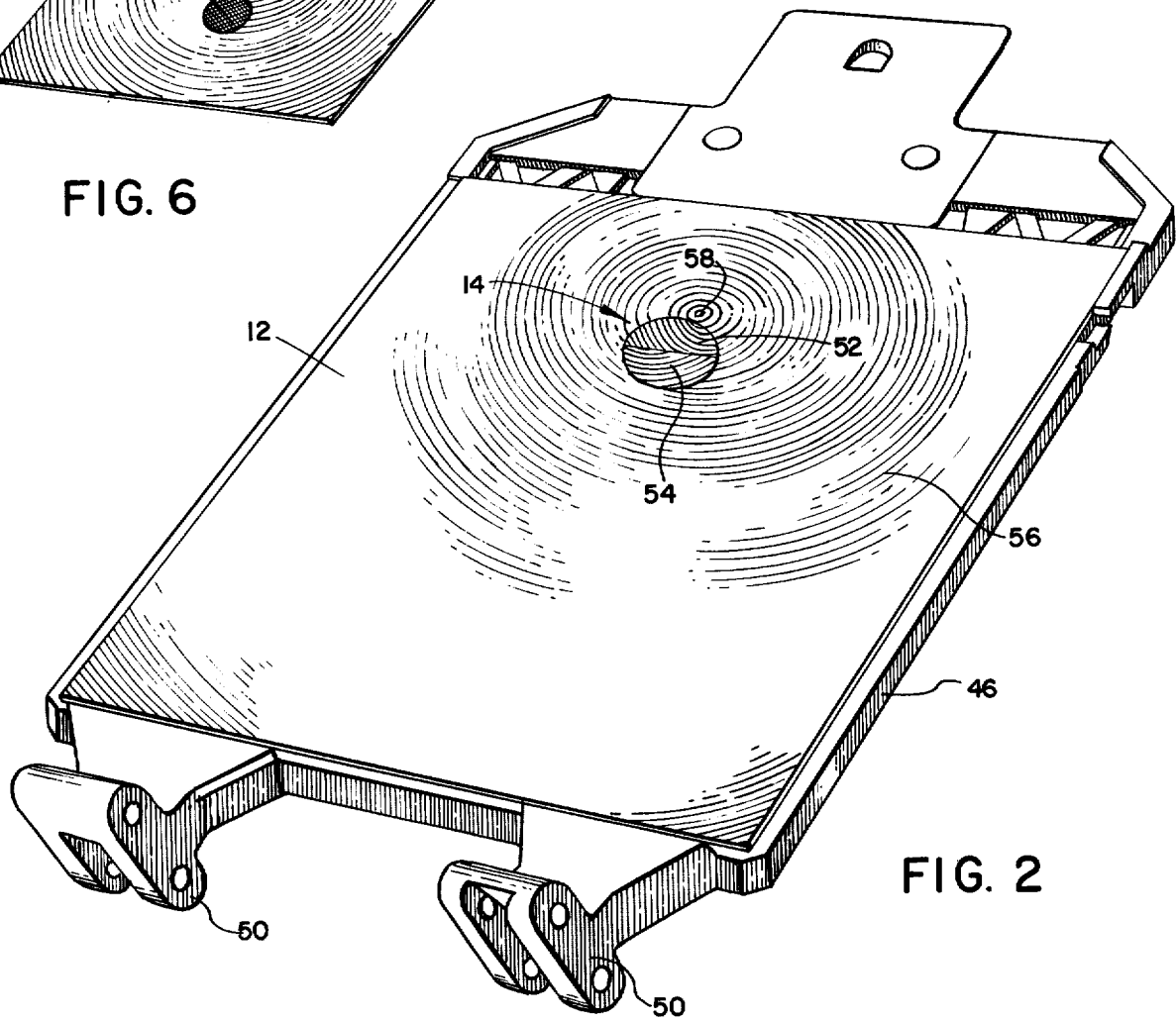
FIG. 2 illustrates a Fresnel focusing screen with a vernier focusing means according to the present invention.

FIG. 2 clearly shows the off-center location of the vernier focusing means 14 on the Fresnel focusing screen 12. It also shows that the center 58 of the echelon rulings 56 is displaced from the geometric center of the focusing screen 12. The displacement of the echelon center 58 from the geometric center adapts the Fresnel focusing screen 12 for use with the off-axis viewing arrangement in the special reflex camera 10 of FIG. 1. The vernier focusing means 14's location on the focusing screen 12 is independent of the echelon center 58's location on the focusing screen 12.

How much the vernier focusing means 14 is displaced from the geometric center of the focusing screen 12 to prevent its being used as a "Bullseye" is a matter of subjective judgment. The important criteria of the invention is that the displacement is at least great enough so the vernier focusing means 14 appears clearly off-center. We find it satisfactory to displace the vernier focusing means 14 from the geometric center of the Fresnel focusing screen 12 by about one-third the distance between the geometric center and the edge. Other amounts of displacement from the center are also within the purview of the invention.

If the off-center location of the vernier is primarily to improve image acuity, by accommodating for the curved field of an objective lens, then its precise distance from the geometric center of the screen will depend on the properties of the objective lens. In the light of our disclosure, those skilled in the optical arts, who should already know how to determine the optimum place for the image surface to cross the film plane, will now know that place of crossing to be the optimum off-center location of a vernier means for a specific objective lens. However, the one-third displacement of the vernier means supra is quite suitable, in most cases, for effecting the compromise in focus that compensates for an objective lens' curved field.

Figure 5A:
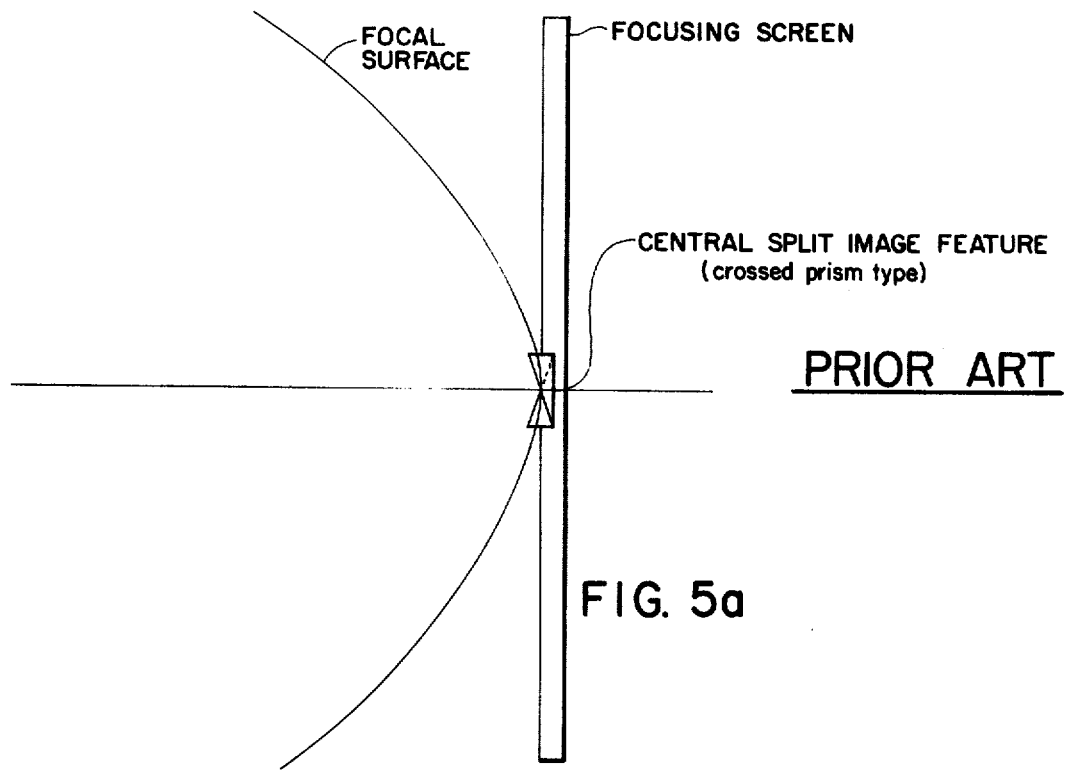
FIGS. 5a and 5b illustrate a comparison between the prior art and the present invention.
Figure 5B:
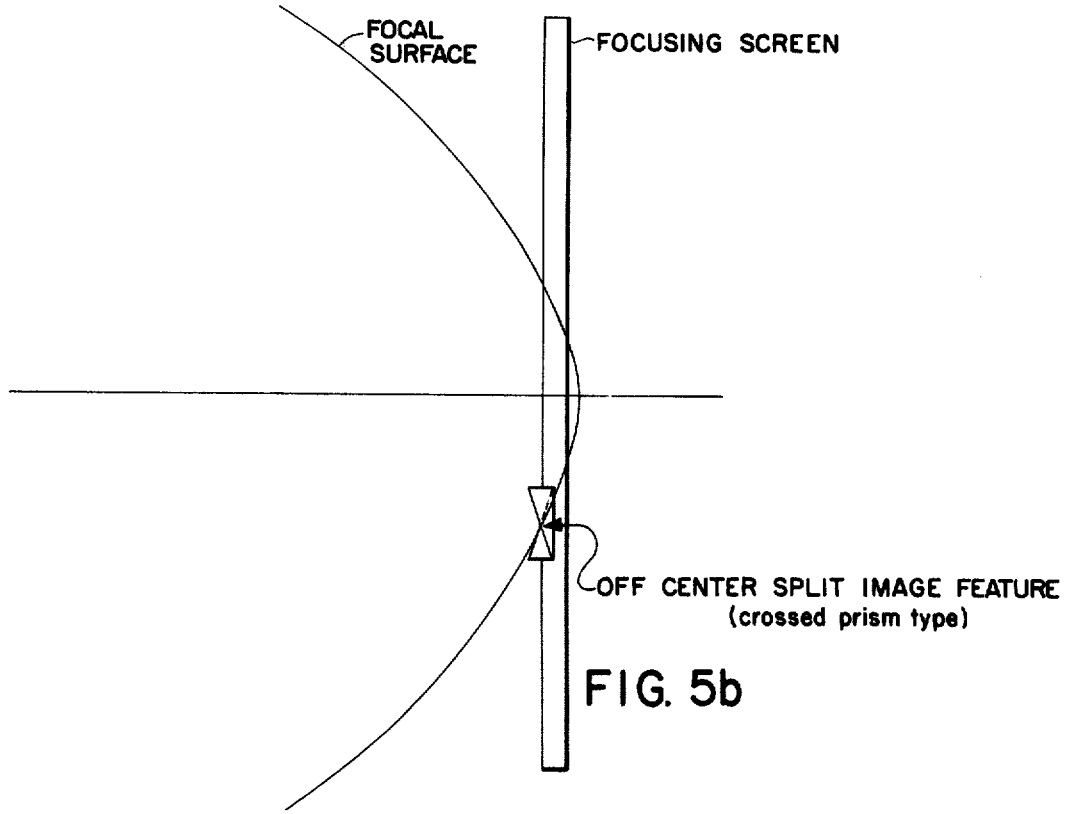

Reference to FIG. 5b reveals the way in which an off-center vernier means affects the best focus compromise for a curved focal surface. The curved focal surface crosses the focusing screen's plane at the vernier means. While both the center and the edge of the focal surface are separated from the focusing screen's surface, either of those separations is only a fraction of the edge's separation in the prior art case (FIG. 5a). From the foregoing, those using our invention will understand the need for a compromise in the off-center location of the vernier means to balance the sharpness of the center and edges of the image for the best overall focus. They will not simply locate the vernier means as far as possible from the center, unless they wish to avail themselves of the invention's aesthetic advantages only.

An examination of FIG. 2 with reference to the semicircular optical elements 52 and 54 of the vernier focusing means reveals that each of them is composed of a plurality of arcuate echelon rulings. The rulings of the semi-circular optical elements 52 and 54 are concentric about points to the right and left, respectively, of the echelon center 58 for the reasons explained below.

To make a Fresnel focusing screen 12 with the Fresnel type vernier focusing means 14 illustrated in FIG. 2, one can begin by making an off-center circular hole in a first concentric echelon ruling 56 that will form the principal portion of the focusing screen 12. The vernier focusing means 14 is later fitted into the hole. The semi-circular optical elements 52 and 54 are cut from second and third concentric echelon rulings like the one from which the Fresnel focusing screen 12 is made. The two semi-circular optical elements 52 and 54 are then assembled in the off-center circular hole.

In one embodiment of the present invention the first echelon ruling 56 is treated so it slightly diffuses the light it reflects. A suitable method for such treatment is disclosed in U.S. Pat. No. 3,718,078, issued on Dec. 31, 1970 to william T. Plummer for SMOOTHLY GRANULATED OPTICAL SURFACE AND METHOD FOR MAKING SAME. The second and third echelon rulings differ from the first only in that they are not treated to diffuse the light they reflect.

From FIG. 2 it is clear that the semi-circular optical elements 52 and 54 are cut from areas displaced from the centers of their respective echelon rulings. The precise areas from which the semi-circular optical elements 52 and 54 are cut depends, in general, upon the reflex camera and viewing system the focusing screen and off-center vernier are to be used with and specifically on the f/no. of its objective lens.

Consider, as an aid to understanding the invention that the focusing screen 12 works in reverse and forms an image of the boot aperture 26 at the center of the objective lens 20. If the focusing screen 12 is shifted laterally a distance $s$, it will shift the image of the boot aperture 26 laterally a distance $b$ in the objective lens 20. The ratio of the boot aperture 26's image displacement, $b$, to the focusing screen 12's displacement $s$, is proportional to the ratio of the optical path length between the objective lens 20 and the boot aperture 26 [call this distance $(F + V)$], to the optical path length between the focusing screen 12 and the boot aperture 26 [call this distance (V)].

The semi-circular elements 52 and 54, each with a center oppositely displaced the distance s from the echelon center 58, form two images of the boot aperture 26 laterally displaced from each other by a distance 2b in the objective lens 20's aperture. This distance 2b represents the base line of the vernier means. The accuracy of the vernier means increases as b increases. However, if b were too large, one or both of the boot aperture 20's images would be formed outside the objective lens 20's aperture. Conversely, the semi-circles 52 and 54 laterally displace the images they form of the objective lens 20's aperture at the boot aperture 26. If they displace those images too much, none of the light reflected by them, in those images, will pass through the boot aperture 26. In consequence, the part of the subject's image formed on the focusing screen 12 within the semi-circles 52 and 54 would be dark.

To insure that the semi-circles 52 and 54 will not appear dark, the distance b is set so the images of the boot aperture 26 will lie well within the objective lens 20's aperture. The displacement, s, of each semi-circle's center from the center of the echelon ruling from which it is taken is equal to $$b \frac{V}{(F+V)}$$

The symbol b represents one-half the baseline of the vernier means; its maximum value is one-half the aperture dimension of the objective lens 20. In practice a designer will want to select a lesser value of b. The direction of the displacement is essentially parallel to the chosen shear line between the halves of the image in the vernier means.

An optimum, but not critical, value of b exists for each camera and objective lens combination to achieve the best agreement between overall image focus and the focus indicated by the vernier focusing means. That value of b is less than the maximum value and is influenced by the aberrations, in particular the spherical abberation, of the objective lens for light incident on it away from its axis. It is also influenced by the manufacturing tolerances used. Those who are sufficiently skilled to be concerned with this further refinement will know how to determine this optimum value of b.

Those skilled in the art and wishing to utilize the concept will now be able to select b and determine s in conformance with the particular design of their own cameras.

The foregoing construction method yields a uniquely thin focusing screen 12. If thinness is not a consideration, simpler construction techniques are possible. Thus, at a substantially off-center location on a focusing screen of any type one can cement a vernier focusing means comprising two oppositely oriented (crossed) thin prisms. Alternatively, an array of microprisms can be ruled on or cemented to a focusing screen at on off-center location or the semi-circular cutouts from the focusing screen can be restored in their place but tilted slightly as required to shear the image falling thereat. All or any of the foregoing focusing aids are contemplated by the term "vernier focusing means".

Multiple copies of a focusing screen 12 with an off-center vernier focusing means 14 according to the invention can be made by any of several appropriate and well-known molding methods.

Figure 3:
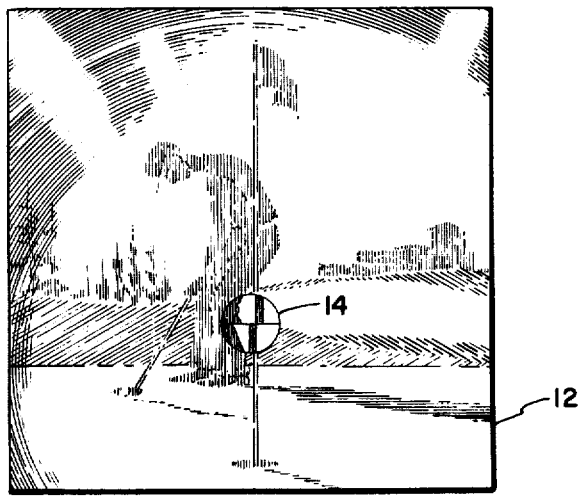
FIGS. 3 and 4 illustrate the appearance of a scene on a focusing screen with a vernier focusing means arranged according to the present invention.
Figure 4:
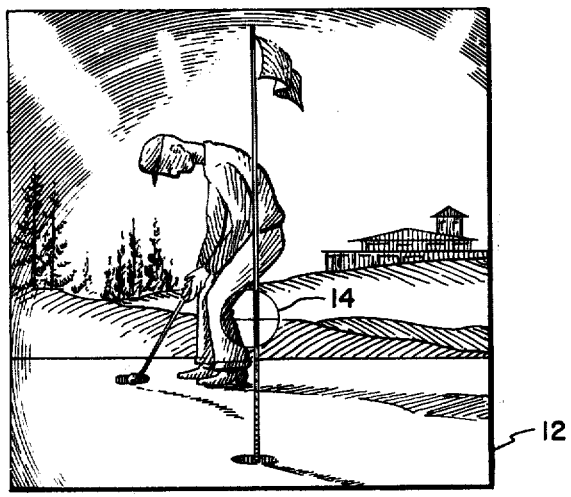

FIGS. 3 and 4 show the appearance of the image seen in a viewfinder with a vernier focusing means according to the invention. When the camera is slightly out of focus, FIG. 3, the overall image is somewhat unsharp and the off-center vernier 14 shows a laterally misaligned image. When the camera is in focus, FIG. 4, the overall image is quite sharp and the off-center vernier 14 shows an aligned image.

The focusing screen 12 may be provided with means, for example, in the manner described in the above-cited U.S. Pat. No. 3,718,078, for slightly diffusing the incident light so that an image appears clearly only when the image is focused on the screen 12. The vernier focusing means 14 is generally not provided with diffusing means so its images can be clearly seen prior to the whole image being focused. FIG. 3 illustrates this arrangement; the images in the vernier means 14 appear sharp though the main image on the focusing screen 12 appears unfocused.

Reference should be had to the camera illustrated in FIG. 7a for another embodiment of the present concept. The rangefinder camera 100 comprises a case 102 with an objective lens 104. The rangefinder 106, on top of the camera case 102, is of the coincident image type and includes a beamsplitter 108 and a pivotably mounted mirror 110 plus three windows in the camera case 102; a primary image window 112; a secondary image window 114; and an eye window 116.

The secondary image window 114 is substantially smaller than the primary image window 112 and offset in such a manner that an observer 118 looking into the eye window 116 sees a scene, such as shown in FIG. 7b. The whole scene 130 comes through the primary image window 112, a small redundant sub-region 132 comes through the secondary image window. The sub-region 132 is offset a predetermined amount in accordance with the teachings of the present invention. The offset is achieved by properly displacing the secondary image window 114, from the location it would have in a conventional coincident image rangefinder camera. The mirror 110 rotates about a pivot 120 under the control of a linkage (not shown) connecting it to the focusing means of the objective lens 104. From the foregoing description those skilled in the art of building coincident image rangefinder cameras will know how to apply this embodiment of the invention to the improvement of their devices.

It will be understood that variations and modifications of my invention are possible in light of this disclosure. In particular, the invention is useful in other types of cameras besides the Polaroid SX-70 Land Camera illustrated in FIG. 1. For example, the invention can be successfully used with a conventional 35mm reflex camera, with a view camera, and with other types of cameras as well. It will also be apparent to those skilled in the art that various changes in form and arrangement may be made to suit specific requirements without departing from the spirit and scope of the invention. Therefore, it is to be understood that, within the scope of the appended claims, the invention may be practiced in a manner than otherwise specifically described herein.

What is claimed is:

1. A photographic camera comprising:

an exposure chamber;

an objective lens to form a real image of a subject at a focal plane inside said exposure chamber;

a focusing screen, at said focal plane, for receiving said real image;

viewing means for enabling an observer to see said real image formed on said focusing screen;

an optical surface, on said focusing screen;

vernier focusing means located on said optical surface a predetermined distance eccentric from the geometrical center of said optical surface;

light diffusing means on said focusing screen surrounding said vernier focusing means;

a first Fresnel echelon on said optical surface surrounding said vernier focusing means for controlling the redistribution of light incident on said optical surface; and a second Fresnel echelon and a third Fresnel echelon constituting said vernier focusing means.

2. A photographic camera comprising:

an exposure chamber;

an objective lens to form a real image of a subject at a focal plane inside said exposure chamber;

a focusing screen comprising a first Fresnel echelon at said focal plane for receiving said real image and controlling the redistribution of light incident on said focal plane;

viewing means for enabling an observer to see said real image formed on said focusing screen;

a vernier focusing means located on said focusing screen a predetermined distance eccentric from the geometrical center of said first Fresnel echelon, said vernier focusing means comprising a second Fresnel echelon and a third Fresnel echelon;

wherein said second Fresnel echelon corresponds to a region of said first Fresnel echelon separated from the region of said first Fresnel echelon where said second Fresnel echelon is located by a distance less than one-half the aperture dimension of said objective lens times the optical path length between said focusing screen and said viewing means divided by the optical path length between said objective lens and said viewing means, and wherein said third Fresnel echelon corresponds to a region of said first Fresnel echelon separated from the region of said first Fresnel echelon where said third Fresnel echelon is located by said distance in an opposite direction.

3. A photographic camera comprising:

an exposure chamber;

an objective lens to form a real image of a subject at a focal plane inside said exposure chamber;

a focusing screen, at said focal plane, for receiving said real image;

viewing means for enabling an observer to see said real image formed on said focusing screen;

an optical surface, on said focusing screen;

vernier focusing means located on said optical surface a predetermined distance eccentric from the geometrical center of said optical surface, said distance being one-third of the distance from said geometrical center to an edge of said focusing screen seen by said observer;

light diffusing means on said focusing screen surrounding said vernier focusing means;

a first Fresnel echelon on said optical surface surrounding said vernier focusing means for controlling the redistribution of light incident on said optical surface; and a second Fresnel echelon and a third Fresnel echelon constituting said vernier focusing means.

4. A focusing screen for a camera, comprising:

an optical surface having a shape corresponding to a predetermined camera format;

vernier focusing means located on said optical surface with its center a predetermined substantial distance away from the geometric center of said optical surface;

a Fresnel echelon, on said optical surface surrounding said vernier focusing means, for condensing light incident thereon;

means, on said Fresnel echelon, for slightly diffusing light incident thereon; and reflecting means on said focusing screen for reflecting light incident thereon, in which said vernier focusing means comprises two semi-circular Fresnel echelons, with dissimilar ruling segments, having a predetermined relationship to each other and to said Fresnel echelon surrounding said vernier focusing means, but without said diffusing means, said semi-circular Fresnel echelons arranged, in relation to each other, to form a circularly shaped region that constitutes said vernier focusing means.

5. A reflex camera comprising:

an exposure chamber;

a focal plane inside said exposure chamber;

an objective lens for forming a real image at said focal plane;

a focusing screen inside said exposure chamber proximate said focal plane and movably mounted for displacement therefrom;

an optical surface on said focusing screen for receiving said real image, said optical surface having a shape corresponding to the photographic format of said reflex camera;

vernier focusing means located on said optical surface with its center a predetermined substantial distance away from the geometric center of said shape;

a Fresnel echelon, on said optical surface surrounding said vernier focusing means, for condensing light incident thereon;

means on said Fresnel echelon for slightly diffusing light incident thereon; and reflecting means on said focusing screen for reflecting light incident thereon, in which said vernier focusing means comprises two semi-circular Fresnel echelons, with dissimilar ruling segments, having a predetermined relationship to each other and to said Fresnel echelon surrounding said vernier focusing means, but without said diffusing means, said semi-circular Fresnel echelons arranged, in relation to each other, to form a circularly shaped region that constitutes said vernier focusing means.

6. A photographic camera comprising:

means forming an exposure chamber;

a focusing screen having a substantially planar optical surface at a focal plane in said chamber;

an objective lens to form a real image of a subject at a non-planar focal surface intersecting said focal plane in a curved line displaced from the geometrical center of said optical surface when said image is best in focus over said optical surface;

viewing means for enabling an observer to see said real image formed on said focusing screen; and vernier focusing means located on said optical surface a predetermined distance eccentric from said geometrical center to present an unbroken image to the observer when intersected by said focal surface, whereby excursions of said focal surface from said focal plane are in opposite directions toward and away from said vernier focusing means along lines intersecting said geometrical center.

7. The camera of claim 6, in which said distance is selected for optimum focus over said optical surface.

8. The camera of claim 6, in which said distance in one-third of the distance from said geometrical center to a boundary of said optical surface.

9. A photographic camera comprising:
means forming an exposure chamber;
a focusing screen having a substantially planar optical surface;
means mounting said screen in said chamber for movement between a first position in which said optical surface is in a focal plane and a second position in which said optical surface is out of said focal plane;
an objective lens to form a real image of a subject at a non-planar focal surface intersecting said focal plane in a curved line displaced from the geometrical center of said optical surface when said screen is in said first position and said image is best in focus over said optical surface;
viewing means for enabling an observer to see said real image formed on said focusing screen when said screen is in said first position; and
vernier focusing means located on said optical surface a predetermined distance eccentric from said geometrical center to present an unbroken image to the observer when intersected by said focal surface, whereby excursions of said focal surface from said focal plane are in opposite directions toward and away from said vernier focusing means along lines intersecting said geometrical center.

10. The camera of claim 9, in which said distance is selected for optimum focus over said optical surface.

11. The camera of claim 9, in which said distance is one-third of the distance from said geometrical center to a boundary of said optical surface.

12. In combination with a camera having an objective lens and a focusing screen adapted to be positioned in an image plane to receive a real image of a scene to be photographed formed by said objective lens, vernier focusing means located on said screen a substantial distance from the geometrical center of said screen, whereby the operator will not tend to use the focusing means as an aiming device, and whereby said vernier focusing device will display an unbroken image when intersected by the focal surface of said lens such that when said focusing screen is in said image plane, said focal surface departs in opposite directions from said image plane toward and away from said vernier focusing device along lines in said image plane through said geometrical center.

13. A focusing screen for a camera, said screen comprising means forming a substantially planar optical surface at a focal plane for receiving and displaying a real image formed by a lens, said surface having a geometrical center at the geometrical center of the image to be displayed, and vernier focusing means located on said surface at a substantial distance from said geometrical center to display an unbroken image when intersected by an image surface, whereby when a lens forming an image on a non-planar focal surface is positioned so that said non-planar focal surface intersects said vernier focusing means to cause an unbroken image to be displayed, said focal surface will depart from said focal plane in opposite directions in directions in said focal plane from said focusing means toward and away from said geometrical center, respectively.

14. The focusing screen of claim 13, in which said distance is one-third of the distance from said center to a boundary of said surface.

* * * * *